April 21, 1953     C. GRAY     2,635,459
AIR AND MOISTURE METER

Filed Aug. 11, 1948     3 Sheets-Sheet 1

INVENTOR.
CHESLEIGH GRAY,
BY: Harold B. Hood.
ATTORNEY.

April 21, 1953
C. GRAY
2,635,459
AIR AND MOISTURE METER
Filed Aug. 11, 1948
3 Sheets-Sheet 2
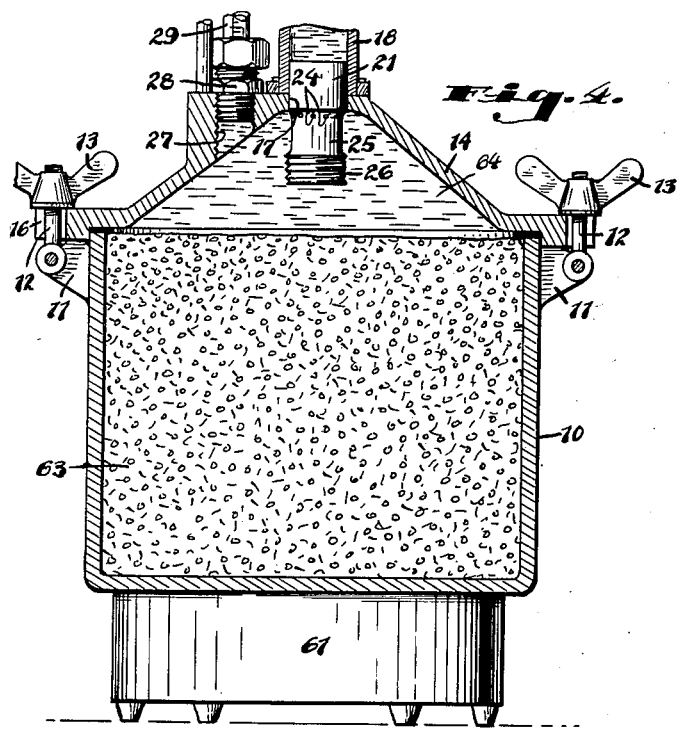
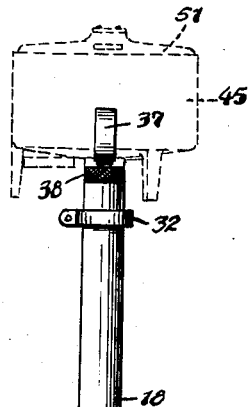
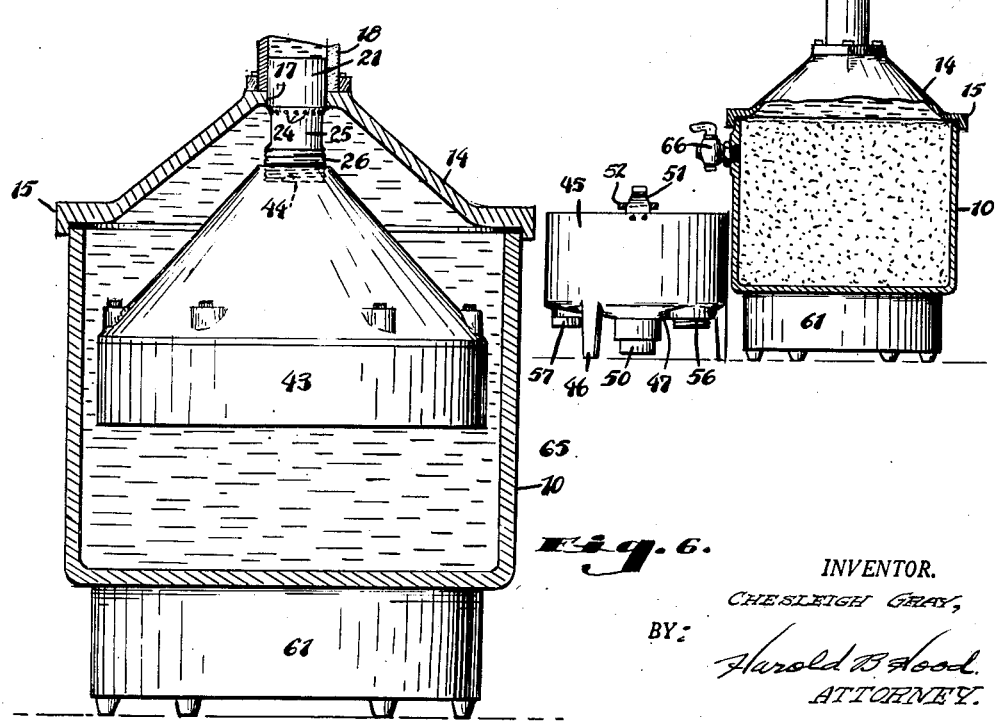
INVENTOR.
CHESLEIGH GRAY,
BY
Harold B Hood
ATTORNEY.

April 21, 1953 C. GRAY 2,635,459
AIR AND MOISTURE METER
Filed Aug. 11, 1948 3 Sheets-Sheet 3

INVENTOR.
CHESLEIGH GRAY.
BY: Harold B Hood
ATTORNEY.

Patented Apr. 21, 1953

2,635,459

UNITED STATES PATENT OFFICE 2,635,459

AIR AND MOISTURE METER

Chesleigh Gray, Indianapolis, Ind.; Mary Edna Gray, executrix of said Chesleigh Gray, deceased Application August 11, 1948, Serial No. 43,702

7 Claims. (Cl. 73—19)

The present invention relates to a meter for determining percentages of surface moisture and entrapped air in samples of aggregate or similar discrete materials, and for determining percentages of entrained air in concrete or the like. The primary object of the invention is to provide apparatus whereby accurate determinations of these factors may be readily made. A further object of the invention is to provide equipment of the character above-described, the selectively usable elements of which are so designed that they may be readily packed into a convenient kit form to be enclosed in a housing to facilitate transportation of the entire equipment from point to point. Still further objects of the invention will appear as the description proceeds.

For facility of disclosure, the apparatus will be described in detail, and thereafter the manner of its use will be explained.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 4 is a fragmentary vertical section through certain of the parts of the apparatus while in use for determining the percentage of entrained air in a sample of concrete;

Fig. 5 is a similar section showing the device in use during a preliminary step in the procedure for determining the percentage of surface moisture in a sample of discrete material;

Fig. 6 is a view showing two successive positions of the parts during a surface moisture determination test;

Figure 1:
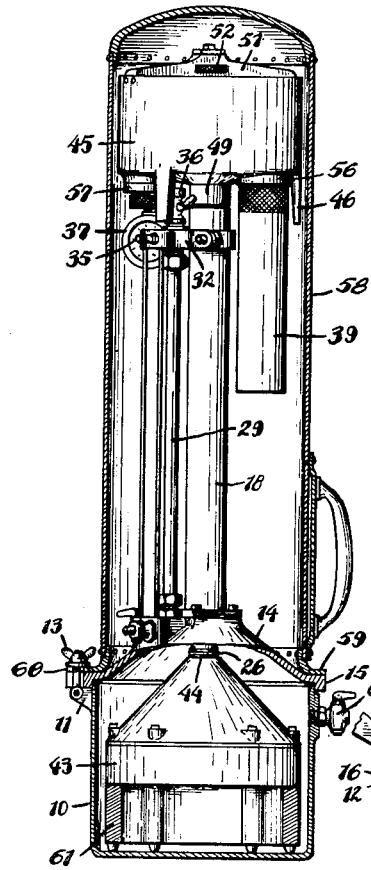
Fig. 1 is a vertical section through the equipment of the present invention when packed in condition for carrying.
Figure 2:
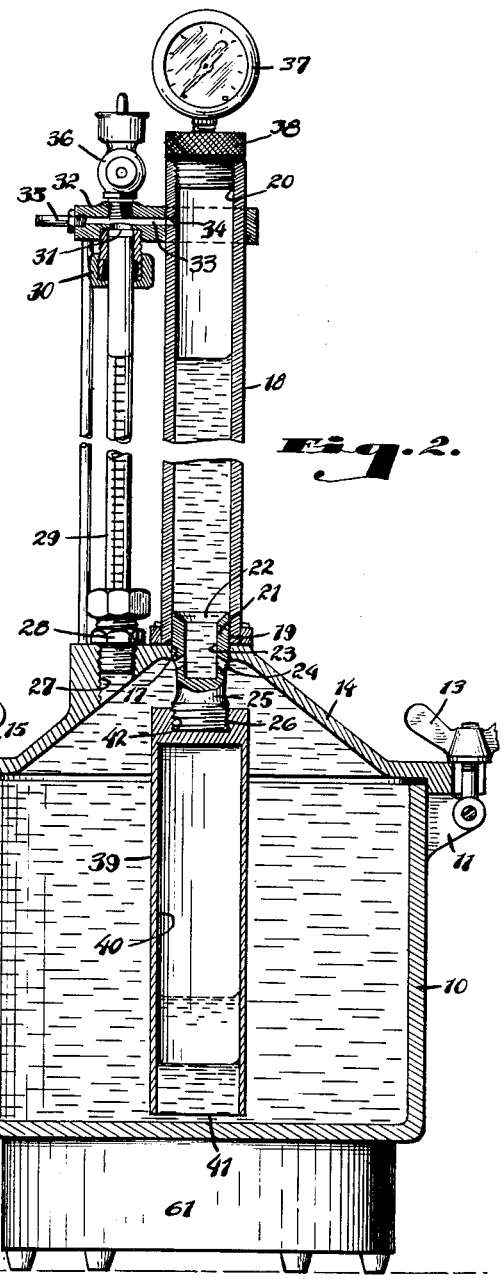
Fig. 2 is an enlarged vertical section of the equipment with parts in position for a preliminary step in the determination of entrapped or entrained air in a sample to be tested.
Figure 3:
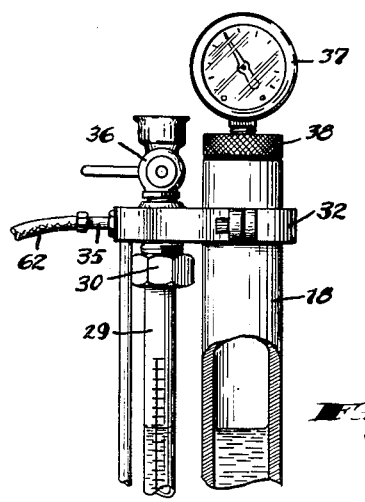
Fig. 3 is a fragmentary view illustrating a further step in that procedure.

Referring more particularly to the drawings, it will be seen that the apparatus comprises a container 10, cylindrical in cross section and having an open mouth. Radially projecting therefrom at peripherally spaced points about its mouth, the container is provided with a plurality of ears 11 to each of which is swiveled a clamping bolt 12 carrying a thumb screw 13. A cover 14, generally conical in shape, is formed with a peripheral flange 15 provided with peripherally spaced radial slots 16, corresponding in number and spacing to the bolts 12, and adapted to receive said bolts, whereby said cover may be clamped to the open mouth of the container 10 in fluid-tight relation thereto.

At its apex, the cover 14 is provided with a port 17 with which registers the lower end 19 of a stand pipe 18, said stand pipe being secured in place on said cover in any suitable manner. The upper end of the stand pipe 18 is formed for removable association therewith of apparatus to be described; and, in the illustrated embodiment of the invention, the upper end of said stand pipe is internally threaded as at 20.

A fitting 21 is associated with the port 17. In the illustrated embodiment of the invention, said fitting 21 is a hollow cylindrical element snugly received in the port 17 with its upper open end 22 disposed within the stand pipe 18 and its lower end 25 projecting into the interior of the coned cover 14. Within said coned cover, the fitting 21 is provided with a plurality of substantially radially opening ports 24 providing communication between the hollow interior 23 of the fitting 21 and the interior of said cover. The lower extremity of the inner end 25 of the fitting 21 is formed for removable association therewith of an attachment; said lower end being externally threaded as at 26 in the illustrated embodiment of the invention.

The cover 14 is formed with a further port 27 in which is received a fitting 28 supporting a lower end of a gauge glass 29 which communicates, through said fitting 28, with the interior of the cover 14. The upper end of the gauge glass 29 is supported by a coupling fitting 30 which provides communication between said upper end of the gauge glass and a port 31 in a fitting 32 which is clampingly supported upon the stand pipe 18 adjacent the upper end thereof. Said fitting 32 is formed with a passage 33 which communicates with the port 31 and with a port 34 near the upper end of the stand pipe 18. The outer end of the passage 33 is equipped with a valved fitting 35, similar to a standard pneumatic tire tube valve, whereby fluid may be pumped to the interiors of the stand pipe 18 and gauge glass 29 at the upper ends thereof. A pet cock 36 communicates with the passage 33 and may be manipulated to relieve pressure therefrom.

A pressure gauge 37 is carried upon a fitting 38 formed for removable engagement with the threaded portion 20 of the stand pipe 18. A displacement member 39, which may be referred to as a calibration tube, provides a chamber 40 having an open mouth 41 at its lower end, and closed at its upper end. At the upper end of said member 39 there is provided an internally threaded socket 42 for removable association with the threaded end 26 of the fitting 21. The parts are so proportioned and designed that, when the member 39 is solidly threaded onto the lower end of the fitting 21 and the cover 14 is clamped in place, in fluid-tight relation with the container 10, the open mouth 41 of the chamber 40 is disposed close to, but out of contact with, the bottom of the container 10. The volume of the chamber 40 bears a precalculated ratio to the volume enclosed within the container 10 and cover 14, for a reason which will appear hereinafter.

Another displacement member 43 comprises a closed body having an external volume which bears a precalculated ratio to the internal volume defined by the container 10 and its cover 14. At its upper end, the body 43 is formed with a blind socket 44 adapted to be threadedly mounted upon the threaded portion 26 of the fitting 21.

Figure 7:
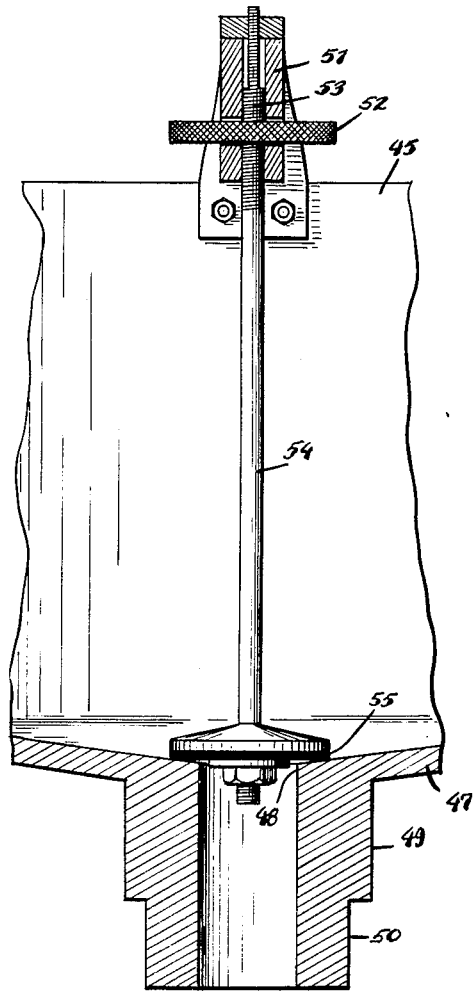
Fig. 7 is an enlarged fragmentary section through a valved receptacle forming one of the elements of the apparatus.
Figure 8:
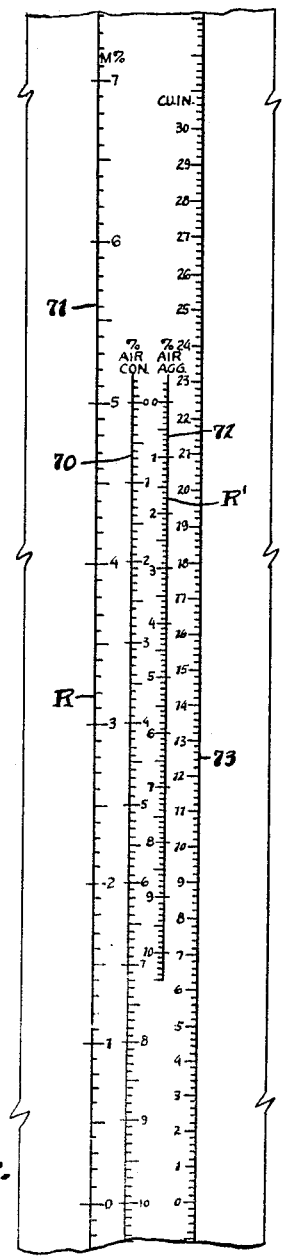
Fig. 8 is a development of the gauge glass comprising an element of the apparatus, showing the various scales used thereon and their relationship to each other.

A receptacle 45 is provided with a plurality of legs 46 projecting below its bottom wall 47. Said bottom wall is dished, as shown in Fig. 7, toward a central port 48 which is guided by a downwardly projecting stud 49 having a reduced and preferably tapered portion 50 adapted to be received in the upper end of the stand pipe 18. A strap 51 traverses the open mouth of the receptacle 45 and supports a nut 52 with which is threadedly associated a threaded portion 53 of a valve stem 54, said valve stem being held, in any suitable manner, against rotation about its own axis. Said stem carries, at its lower end, a valve 55 adapted to seat upon the mouth of the port 48 in the base of the receptacle 45. It will be obvious that, by manipulation of the nut 52, the stem 54 may be reciprocated to move the valve 55 toward or away from sealing association with the port 48.

At a point radially spaced from the stud 49, the bottom external wall 47 of the receptacle 45 is provided with an externally threaded blind stud 56 with which may be threadedly associated the socket 42 of the member 39. At another point radially spaced from said stud, said wall 47 is provided with a blind, internally threaded socket 57 for the threaded reception of the threaded end of the fitting 38.

When the apparatus is to be transported from one point to another, the member 43 is associated with the fitting 21, a stool 61, later to be described, is placed in the bottom of the container 10, and the cover 14 is placed on the container. The parts are so proportioned that, under these circumstances, the bottom of the member 43 just contacts the top of the stool 61.

Now, the gauge 37 is secured in the socket 57 and the member 39 is secured to the stud 56. The extension 50 of the stud 49 is now entered in the upper end of the stand pipe 18, all in the manner illustrated in Fig. 1; and thereafter a housing 58 is sleeved over the cover 14, the stand pipe 18, and the parts associated therewith. At its lower end, the housing 58 is provided with a radially projecting flange 59 which is formed with a plurality of slots 60 for registry with the slots 16. The bolts 12 are now swung into their respective slots 16 and 60, and the nuts 13 are turned down to secure the cover 14 in place on the container 10 and concurrently to secure the housing 58 in place on the cover. Now, the entire equipment can be carried by the handle with which the housing 58 is provided.

When a test for entrapped or entrained air is to be made, the displacement member 39 is associated with the fitting 21, the container 10 is partially filled with water, and the cover 14 is then fastened in place on the container. Now, more water is poured into the equipment through the upper end of the stand pipe 18, until the level in the stand pipe and in the gauge glass 29 rises to the zero point on the "air in concrete" scale 70. Now, the fitting 38 with its pressure gauge 37 is turned tightly into the upper end of the stand pipe 18 and, if the pet cock 36 has heretofore been opened, it will be closed. A hose 62, leading from a source of air under pressure, is attached to the fitting 35, and air is forced into the upper end of the stand pipe 18 and gauge glass 29 to produce a super-atmospheric pressure above the columns of water standing therein. Thereby, water will be driven upwardly into the chamber 40, compressing the air entrapped in said chamber; and the columns in the stand pipe 18 and gauge glass 29 will be driven downwardly. When those columns have been driven downwardly to a degree which may be expressed as $$\frac{V_T \times 100}{V_c}$$

(where $V_T$ equals volume in cubic inches of the chamber 40 and $V_c$ equals volume in cubic inches of the container 10) the gauge 37 will show a pressure reading which should be recorded as P.

Each major division on the scale 70 represents one percent (1%) of air, and each minor division thereof represents one-tenth percent ($\frac{1}{10}$%) of air.

Now, the equipment is emptied, and the container 10 is filled with concrete, the concrete being rodded and then struck off flush with the open mouth of the container. The cover is replaced and secured in position, and the equipment is again filled with water, either through the pet cock 36 or through the upper end of the stand pipe 18 from which the fitting 38 has been removed, to bring the water level to the zero point on the scale 70. Thereafter, the equipment being again sealed, the hose 62 is again attached to the fitting 35, and air is pumped into the equipment until the reading P on the gauge 37 is attained. The air entrained in the concrete will thereby be compressed to a degree corresponding to the degree of compression which occurred during the preliminary operation; whereby the columns in stand pipe 18 and gauge 29 will again be depressed to a degree corresponding to the percentage of air entrained in the concrete; and that percentage can now be read directly on the scale 70.

Conveniently, the parts may be so proportioned and designed that the major divisions of the scale 70 may be spaced one inch (1'') apart.

A second scale 71 may be established to read in percentage of surface moisture on saturated discrete material. The volume of water, measured in cubic inches, required to raise the column in the gauge glass 29 to the zero point on scale 71, after a sample of discrete material of known weight and known specific gravity, has been placed in the container, will be equal to the volume of water, in cubic inches, required to fill the apparatus to that zero point, reduced by the absolute volume in cubic inches of the sample, in a saturated surface-dry condition. This may be expressed as $$V_0 - \frac{W_s \times 1728}{w \times s}$$

(where $V_0$ equals volume of water in cubic inches required to fill the apparatus to the zero point on scale 71, $W_s$ equals weight of the sample in pounds, $w$ equals the density of water at 70° F. in pounds per cubic foot, and $s$ equals specific gravity of the sample).

Now, if the sample ($W_s$) is not surface-dry, but instead carries one percent (1%) by weight of surface moisture, then the sample is made up of .99 $W_s$ pounds of aggregate and .01 $W_s$ pounds of water. The volume change for one percent (1%) surface moisture, will then be $$\left(\frac{.99 W_s \times 1728}{w \times s} + \frac{.01 W_s \times 1728}{w}\right) - \frac{W_s \times 1728}{w \times s}$$

It will be apparent that $$G_M = \frac{c}{A_t} \text{ inches}$$

(where $G_M$ equals the length in inches of a major calibration on the scale 71, $c$ equals the volume change of $W_s$ due to one percent (1%) surface moisture, and $A_t$ equals the sum of the cross sectional areas of the stand pipe 18 and the gauge glass 29 in square inches). Thus, the major divisions of the scale 71 will have a length, in inches, equal to $G_M$ inches; and each of those major divisions will be divided into tenths, so that surface moisture in tenths of percent may be directly read from the scale 71.

A third scale 72 is established by the following procedure. With zero on the scale 72 coincident with zero on the scale 70, we may lay off divisions toward the bottom of the tube, each having a length in inches which may be expressed as $$g_a = \frac{100 \times c \times G_a}{V_c}$$

(where $c$ equals volume change of a sample of aggregate resulting from one percent (1%) of surface moisture; $G_a$ equals length in inches of a major division on the scale 70; and $V_c$ equals the volume of the container 10). Each major division of the scale 72 may be divided into tenths; and from that scale we can read directly the percentage of air entrapped in a sample of the discrete material.

If a sample of material having a specific gravity different from that upon which the graduations of scale 72 are based, is to be tested, we use a sample ($W_s$) whose weight may be expressed as $$\frac{100 c \times w \times s}{1728 \times (s-1)}$$

Now, in order to make a complete moisture test on a composite sample of fine and coarse aggregate to be used in concrete on the basis of 40% fine and 60% coarse, a representative sample of each type of aggregate is selected and a mixture comprising .4 $W_s$ pounds of fine aggregate and .6 $W_s$ pounds of coarse aggregate is placed in the container 10. Now, the volume of water required to bring the water level to the zero point on scale 71, assuming the sample to be absolutely surface-dry, is measured in any suitable manner, and a portion of that volume is poured into the container to bring the level therein near the top of the container. Now the cover 14 is assembled in fluid-tight relation to the container, and the remainder of the predetermined mass of water is added. Let us assume that the liquid level is thus brought to the point R on the scale 71. That reading is now recorded.

Now, further water is added to bring the water to the zero point on scale 72. Sealing the assembly, the hose 62 is attached and air is introduced into the system until the reading on the gauge 37 is that which was noted as P during the calibration of the meter. Let us assume that this operation brings the water level to the point R' on the scale 72. Now, the reading on the scale 72 (1.7) is deducted from the reading on the scale 71 (3.2); and the remainder (1.5) indicates the percentage of surface moisture in the sample of aggregate.

The predetermined volume of water, abovementioned, may be measured in any suitable manner; but I prefer to provide means, incorporated directly in the present kit, for accurately measuring it. If it were determined by weight, of course corrections would have to be made for temperature and very accurate balances would be required. The apparatus of the present invention permits an accurate determination of the required volume of water.

The volume of the displacement member 43 is accurately precalculated to exceed, by a predetermined amount, the absolute volume of the surface-dry aggregate sample for the purpose of the test. Let us assume that the volume of said member exceeds such theoretical volume by ten cubic inches.

Now, in order to determine the proper amount of water to be used, the member 43 is secured to the fitting 21 in the manner illustrated in Fig. 5 and the cover 14 is secured in place on the container 10. The container 10 may, if desired, be partially filled with water before the cover is located. Now, water is added, through the stand pipe 18 or the pet cock 36 until the level in the gauge glass 29 rises to calibration No. 10 on the scale 73. A pet cock 66 is associated with the container 10 near the top thereof; and now the parts are brought into the association illustrated in Fig. 5, with the container resting on the stool 61 to bring the level of the pet cock 66 well above the open mouth of the receptable 45. With the valve 55 closed, water is drained from the container 10 until its level falls to the level of the pet cock 66. Now, the cover is removed and the body 43 is removed from the fitting 21. Of course, the water level will drop further upon removal of the member 43.

Now, the predetermined weight of aggregate is introduced into the container 10, the pet cock 66 is closed, and the cover 14, without the member 43, is replaced. The reduced extension 50 of the stud 49 is now entered in the open upper end of the stand pipe 18, in the manner suggested in dotted lines in Fig. 5, and the nut 52 is manipulated to open the valve 55, whereby all of the water in the receptacle 45 is returned to the meter.

Since the volume of the aggregate sample (assuming a perfect surface-dry condition) is precisely ten cubic inches less than the volume of the member 43, return of the water previously drained from the assembly will return the liquid level in the gauge glass 29 exactly to the zero mark on the scales 71 and 73. If, however, any surface moisture is present on the aggregate, the liquid level in the gauge glass 29 will rise above the zero mark to some reading such as R, that reading representing volume occupied by surface moisture and entrapped air. Now, the steps above described for obtaining the reading R' are followed and, through simple subtraction, the percentage of surface moisture present is determined.

There are three sources of error in the above procedure which have not heretofore been considered.

1. When additional water is introduced, for the purpose of obtaining a reading R', a slight compression of entrapped air will occur due to the added liquid head represented by the difference between reading R and zero on the scale 72.

2. The volume of the container assembly will be minutely increased by the application of air pressure in pumping the liquid down in the stand pipe and gauge glass.

3. A small amount of air is entrapped in the pores of the aggregates, whether alone during the moisture test or as a part of the concrete during an air entrainment test.

It is doubtful whether any of these, or the combined effect of them all, will result in errors of considerable magnitude as compared with possible errors in selection of samples, in calibration of the gauge glass or in measuring devices used in the commercial mixing of concrete. However, calculations may be provided to correct for such errors, if desired.

1. The additional head can be calculated to its pressure equivalent, which may then be deducted from the reading on the pressure gauge 37 when making a surface moisture determination. This error may be expressed as $e_1$.

2. With water at room temperature, fill the assembly to the zero point on scales 70 and 72, the container also being at room temperature. Now let the filled assembly stand for one hour, maintaining absolute uniformity of room temperature and striking the container lightly several times each fifteen minutes with a wooden or rubber mallet. If the water level has changed during the hour of test, return that level to the zero point on the scales 70 and 72, screw the fitting 38 into place, apply the predetermined pressure, as indicated by the gauge 37, and read the scales 70 and 72. Call the reading on scale 72 $e_2$ and the reading on scale 70 $e_3$. These errors are due to change of volume of the equipment in response to the pressure change.

3. Introduce into the container 10 a sample of the predetermined weight of the aggregates, and add sufficient water to bring the water level within about three inches of the top. Stir the sample to eliminate all entrapped air. Now fasten the cover in place, pour in sufficient water to bring the level to the zero reading on the scales 70 and 72. Now pump air to bring the pressure in the assembly to the predetermined reading on gauge 37. Read scale 72 and call this reading $e_4$. Compute the weight of aggregates in the standard sample of concrete and apply the percentage that the weight of the sample of aggregate bears to that weight and apply it to the reading $e_4$. Call the result $e_5$, which is the error resulting from the entrapped air in the pores of the aggregate in the concrete sample; $e_4$ being the error of entrapped air in the pores of the aggregate used in the surface moisture determination.

The total error in the "air in aggregates" due to sources 2 and 3 is $e_2+e_4$. A mark may be made above the zero point on the scale 72 at a distance equal to a reading corresponding to this total error. Then, if when testing for air in aggregates, the water level is first brought to this mark instead of to the zero point, all of the apparent errors are compensated for and the meter reading, after the application of the predetermined pressure, as read on gauge 37, is correct.

The total error in the "air in concrete" scale 70 is $e_3+e_5$. This scale may also be corrected by placing a graduation above its zero point in the same manner.

The error $e_1$ is for the surface moisture test only; and since it varies according to the percentage of moisture, it must be computed and deducted for each test, for absolute accuracy.

I claim as my invention:

1. In a device of the class described, a container, a cover therefor, means for securing said cover on said container in fluid-tight relation, said cover being provided with a central port, a standpipe in communication with said port, a gauge glass supported on said cover and communicating at its lower end with a second port in said cover and, at its upper end, with said standpipe, a valved conduit communicating with the upper ends of said standpipe and said gauge glass, and a pressure gauge associated with the upper end of said standpipe to indicate fluid pressure conditions existing therein.

2. The device of claim 1 including a fitting associated with the first-named port in said cover, a displacement member adapted to be received in said container and having a volume bearing a pre-calculated ratio to the internal volume defined by said container and cover, said fitting providing a support for said member substantially coaxial with said stand pipe, and providing further a passage establishing communication between said stand pipe and the interior of said cover.

3. The device of claim 2 in which said fitting comprises a hollow element having an open end received in said port and having a closed end disposed within said cover, and in which said fitting is provided with a plurality of ports intermediate its ends and opening substantially radially from its interior into the space within said cover.

4. The device of claim 2 in which said displacement member is hollow and has an internal volume bearing a pre-calculated ratio to the internal volume defined by said container and cover, said member further having an open end and a closed end, said open end being disposed near the bottom of said container when the closed end is mounted on said support and said cover is associated in fluid-tight relation with said container.

5. The device of claim 2 in which said displacement member is closed and has an external volume bearing a pre-calculated ratio to the internal volume defined by said container and cover.

6. The device of claim 2 in which said displacement member is closed and has an external volume exceeding by a predetermined amount the volume of a sample of material to be tested in said device.

7. The device of claim 1 in which said gauge glass is provided with a plurality of scales, each peripherally spaced from each other, and each calibrated differently from each other.

CHESLEIGH GRAY.

References Cited in the file of this patent

UNITED STATES PATENTS

| Number | Name | Date |
|---|---|---|
| 2,056,196 | Knappen | Oct. 6, 1936 |
| 2,113,686 | Gift | Apr. 12, 1938 |
| 2,280,617 | Bell | Apr. 21, 1942 |
| 2,293,488 | Bays | Aug. 18, 1942 |

FOREIGN PATENTS

| Number | Country | Date |
|---|---|---|
| 515,921 | Great Britain | Dec. 18, 1939 |